United States Patent [19]
Wilhelmsson

[11] Patent Number: 5,654,969
[45] Date of Patent: Aug. 5, 1997

[54] ARRANGEMENT IN A COMMUNICATIONS NETWORK

[75] Inventor: Lennart Wilhelmsson, Haninge, Sweden

[73] Assignee: Telia Research AB, Farsta, Sweden

[21] Appl. No.: 454,191

[22] PCT Filed: Dec. 15, 1993

[86] PCT No.: PCT/SE93/01069

§ 371 Date: Aug. 11, 1995

§ 102(e) Date: Aug. 11, 1995

[87] PCT Pub. No.: WO94/14255

PCT Pub. Date: Jun. 23, 1994

[30] Foreign Application Priority Data

Dec. 17, 1992 [SE] Sweden ............................. 9203796

[51] Int. Cl.[6] .................................................. H04J 3/02
[52] U.S. Cl. ............................................... 370/460; 370/909
[58] Field of Search ......................... 370/85.1, 85.4,
370/85.5, 94.1, 94.2, 94.3, 60, 60.1, 442,
443, 444, 450, 451, 452, 458–460, 465–470,
477, 479, 489, 904, 906, 908, 909, 910,
911, 337, 347, 404, 401–403, 424, 423,
469, 502, 504, 508, 512; 340/825.02, 825.05;
375/355, 356

[56] References Cited

U.S. PATENT DOCUMENTS

| | | | |
|---|---|---|---|
| 4,665,518 | 5/1987 | Champlin et al. | 370/85.1 |
| 5,043,981 | 8/1991 | Firoozmand et al. | 370/85.1 |
| 5,414,701 | 5/1995 | Shtayer et al. | 370/60.1 |
| 5,420,858 | 5/1995 | Marshall et al. | 370/60.1 |

FOREIGN PATENT DOCUMENTS 0343319  11/1989  European Pat. Off. .

*Primary Examiner*—Dang Ton
*Attorney, Agent, or Firm*—Oblon, Spivak, McClelland, Maier & Neustadt, P.C.

[57] ABSTRACT

In a communications network, first information items are transmitted synchronously and second information items asynchronously. The second information items are overlaid on the synchronously transmitted first information items. A bandwidth accessible on transmission can be variably distributed between the first and second information items and, with the desired variable distribution, transmitting and receiving units become synchronized by synchronization information which is transmitted via a channel established for asynchronous transmission between the transmitting and receiving units.

26 Claims, 8 Drawing Sheets

ARRANGEMENT IN A COMMUNICATIONS NETWORK

BACKGROUND OF THE INVENTION

1. Field of the Invention

The present invention relates to an arrangement in a digital communications network for transmitting synchronously transmittable first information items, for example speech, video and/or data, and asynchronously transmitted second information items, for example data.

2. Description of the Related Art

The invention can be used, inter alia, in connection with the so-called "hardware platform" corresponding to the longitudinal layer of the OSI model, in which, especially, the MAC (Medium Access Control) part is of interest. The invention also takes into account the existing physical layers and utilization of current software which is included. The invention can be used, inter alia, with a DTM (Dynamic Synchronous Transfer Mode) protocol such as that used in the MultiG project and; to the proposed IEEE 802.9.

Circuit switching has traditionally been considered to be good for transmitting speech. In digital communication, synchronous and asynchronous multiplexing are known. In synchronous multiplexing, the information is transmitted in channels which consist of time slots which are permanently allocated in advance. The communication is connection-oriented, that is to say must be preceded by a call set-up. A time interval can contain time slots for different channels. One cycle of recurrent time slots is called a frame. This synchronous multiplexing is one way of implementing circuit switching.

In connection with the integration of speech, video and data in local area networks, (LAN) it is quite generally known to produce dynamic bandwidth allocation. Bandwidths which are not used for speech and image communication can be used for asynchronous data communication. It is known per se to utilize a system of the token-ring type and message coding with differential Manchester coding. In connection with this, it has been proposed to utilize the token-ring system in a time-division multiplexed (TDM) connection.

Reference is made to, among others, American patent specification U.S. Pat. No. 4,866,704 which describes an asynchronous fiber optical local area network. The network supports data packet traffic together with synchronous voice traffic over a common token-ring channel.

From American patent specification U.S. Pat. No. 4,843,606 it has previously been known to utilize a communications system in local connection with the token-ring principle. Synchronous bandwidth management is utilized for giving prioritized functions for quasisynchronous frames with regular intervals. The "rings" are mutually connected through a time-division multiplex unit via its synchronous bandwidth manager. Buffers are arranged in each synchronous bandwidth manager for synchronous information blocks transmitted from and to a respective ring. A TDM control unit utilized can independently reach the said buffers for TDM rerouting via individual bytes in the information block which can consist of voice information. The buffer arrangement can include FIFO (First-in-First-out) buffers. The rings are also mutually connected within a "backbone" bus or ring for transmitting asynchronous data between the rings. The number of rings can be one or more.

Reference is also made to American patent specification U.S. Pat. No. 4,785,448, which relates to a local area telephone system for simultaneous transmission of digital data and analog voice signals on the same transmission medium. The station units are physically connected in a star configuration. Token-ring transmission is also utilized. Moreover, Manchester coding is utilized.

Reference is also made to American patent U.S. Pat. No. 4,553,234 which relates to a broadband local area network with token-ring transmission and time-division multiplex in both circuit-switched and packet-switched traffic. In connection with the known arrangement, data, image and speech traffic is transmitted, among others.

In American patent specification U.S. Pat. No. 4,459,558, a token-ring protocol for a local area network is utilized. A ring binds together a plurality of stations for forming a local area network. Each respective station is allocated one or more of three priority levels corresponding to service types. The highest level guarantees a bandwidth, for example for digital voice data. The second level relates to interactive data communication without absolute bandwidths guarantee. Level 3 relates to low-priority transmission.

DESCRIPTION OF THE INVENTION

Technical Problem

Use of personal computers in networks continues to increase conspicuously. In connection with this, there is a need to be able to utilize generally acceptable systems of the Ethernet or token-ring type which can cope with transmitting speech and image in real time. Such integrated communication can be seen as a precondition for increased use of personal-computer-based speech and video services. In practice, however, there is the highly technical problem of implementing protocols of the type needed to establish an effective and appropriately operating network with such capabilities.

It is possible to transmit speech and video with good quality in a special transmission. Important parameters in connection with services which contain images or sound are the delay and the variation which can be found in the delay, or so-called jitter, which implies a lack of stability because the delay is different at different times. In video, such variations are experienced as discontinuities. Sound is even more sensitive to such time stability problems. Existing networks can be divided into two types relative to delay variations. The first type is of the asynchronous type and it is characterized by an unspecified delay which leads to unspecified jitter. The asynchronous type network is normally associated with non-real time applications and is thereby less suitable for video and sound. The second type is of the synchronous type and is characterized by specified delay and specified jitter and can therefore be utilized as a suitable transmission medium for video and sound. The present invention is based on this knowledge.

The present invention is also based on the fact that there will be a varying requirement for bandwidth. For it to be possible for this to be met, an access method is required which involves dynamic allocation of bandwidths. Disregarding the D channel in basic access in ISDN (Integrated Services Digital Network), which has a speed of 16 kbit/s, the minimum speed is 64 kbit/s for a B channel. The image coding standard H.261 prescribes communication channels which are multiples of 64 kbit/s, which should be the minimum units for bandwidth allocation. The present invention also takes into account this relationship.

In accordance with the invention, the protocol utilized should provide minimum delay and minimum variations in the delay with speech and image transmission. In one embodiment, it is possible to utilize a "real" LAN access protocol. The aim with such a protocol is that the communications medium will be allocated by the associated nodes and that the exchange functions will be distributed (non-centralized exchange). The principle of the protocol will also be such that it can be used both with speeds corresponding to those which are used today for Ethernet and token-ring and higher speeds for future development. For the asynchronous part, one embodiment uses a combination of existing protocol for data link layers and physical layers for avoiding the need for any new design. The invention also entails the use of network software which is already in existence. The invention also is compatible the use of advanced communication circuits for LAN data communication to as great an extent as possible. The protocol of this invention will enable dynamic allocation of bandwidths to be provided for the different communication channels. Bandwidths which are not used for speech and image communication will be accessible for the common asynchronous LAN data communication. Also, a common asynchronous channel for LAN data communication can be used. These channel bandwidths are varied dynamically. So that, if a number of asynchronous channels are used, the bandwidth is reduced for each channel by a corresponding degree. The invention takes into account these rated characteristics and also solves the noted problems.

Thus, according to the invention information items asynchronously transmitted are overlaid on information items which are transmitted synchronously, moreover, transmission accessible bandwidths are variably distributed between the synchronous and asynchronous information items, and, in the desired varied distribution, transmitting and receiving units become synchronized by means of synchronization information which can be transmitted via a channel established, for example, for the synchronous transmission, between the transmitting and receiving units.

In one embodiment, the arrangement operates with a synchronous first protocol of the DTM type and an overlaid asynchronous second protocol of the token-ring type which operates with high access fairness, which first and second protocols form a hybrid access protocol. In one embodiment, the synchronous protocol is arranged for dynamic bandwidth allocation and the overlaying of the second protocol is arranged to occur in at least one time slot with a variable number of bits. Setting up and clearing or coupling in and out of synchronous connections is carried out via a data communication channel, preferably an asynchronous data communication channel. In one embodiment, the arrangement comprises or forms an ISDN-compatible business exchange with connection-oriented speech, video and/or data communication and connectionless data communication. Connectionless is here meant to be a connection which is not determined in advance. In a further embodiment, the arrangement comprises a number of function terminals, which means terminals for managing data and speech, video, music and so forth. The said terminals can thus consist of personal computers. The arrangement operates with image communication, preferably in the range of 64 kbit/s to 2 Mbit/s. In one embodiment, the arrangement utilizes a combination of DTM and token-ring principles. Characteristics, for example topology, transmission rate and/or coding and so forth from the token-ring concept are used as a complement to the DTM concept. The arrangement can be considered to consist of or include an access protocol for integrating speech, video and data in a local area network for speeds up to about 20 Mbit/s. In a preferred embodiment, the arrangement consists of a local area network with personal computers which can be used for all types of communication, primarily speech and data. In a preferred embodiment, the arrangement forms a local area network which, in relation to the network, renders unnecessary a separate business exchange or business exchanges which can be represented by software in the local network. The said network can thereby communicate with external ISDN communication via one or more bridges from or to one or more communication servers. A respective terminal in the local network and respective server can thereby be arranged with an interface to the local network. The said local network is transparent for normal data communication occurring in the network. In one embodiment, a universal network is created with universal terminals. The arrangement functions both for narrow-band technique and broadband technique.

What has been proposed above provides a protocol with a number of good characteristics. It thus becomes possible to utilize a technique which builds on existing known circuits in connection with the token-ring. It thus becomes possible to integrate speech and data in a local area network by switching together ISDN business exchanges with a LAN via a bridge which makes it possible to utilize standard components. Using the invention, a local area network can be offered which copes with different types of communication in one network. Business exchange services in the local area network can replace a small business exchange. Telephony with a possibility for data support in the personal computer and access to a large number of ISDN services can be expected to provide increased supply of existing communications assortment. A provider of a local area network can also offer telephone services in connection with these. Multi-functional terminals in a local-area multi-services network correspond to ideas which form the basis of the public ISDN network and are in accord with the development expected in the telecommunications field. Products for local area networks can be offered and ISDN products can be interconnected in local area networks according to the invention. The invention makes it possible to utilize known protocols for synchronous communication for speech, video and data. In this respect, reference can be made to DTM which operates with little delay and with dynamic broadband allocation. For asynchronous communication, a token-ring protocol or fiber distributed data interface protocol is utilized which is a well proven and a synchronous protocol having a standard format. A token-ring protocol also provides a fair distribution of access and is applicable to higher speeds then those used at present. Token-ring subframes in a time slot or time slots can thus be utilized in DTM, which is characterized by dynamic and synchronous transmission with mode division. The need is to add to and change synchronous information. One works with capacity and synchronizes the Not-Data signal. The advantages of topology, speed and coding (differential Manchester coding) which characterize the token-ring protocol can be implemented.

The said integration of speech and data in LAN provides the users of the local area network with the possibility of access to computer-aided telephony, computer-aided PLUS services, computer-aided voice mail, business exchange services, ISDN services (image) and/or distributed radio programmes and/or distributed music, stereo (two channels are available).

BRIEF DESCRIPTION OF THE DRAWINGS

The present invention will be more clearly understood by reference to the following detailed description when considered with the accompanying drawings, wherein.

DESCRIPTION OF THE PREFERRED EMBODIMENTS

Figure 1:
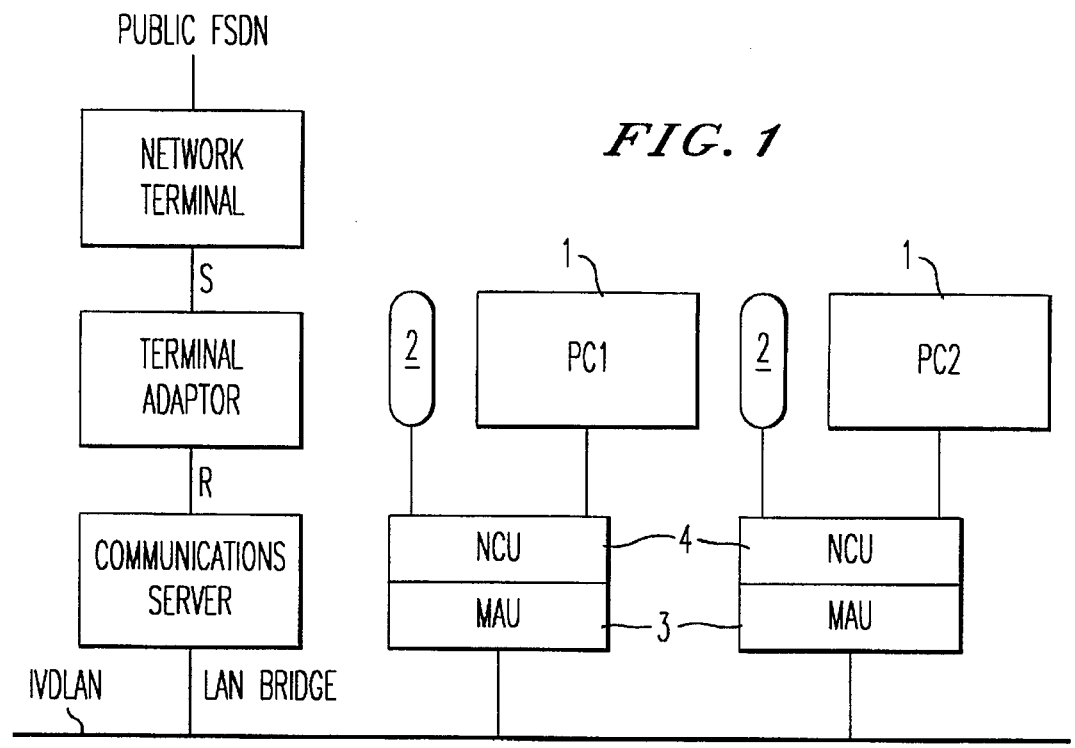
FIG. 1 shows in basic diagram form the structure of a local area network with integrated speech and data and interface to a public ISDN network.

FIG. 1 shows a local area network IVDLAN which constitutes a local area network for integrated speech and data. The network is connected to personal computers PC 1 and PC 2 indicated as units 1 of a type known per se. The respective personal computers are connected via a medium attachment unit MAU (3) and a network communication unit NCU (4). A device 2 (telephone, microphone and so forth) provides a periodic signal input. The periodic device 2 operates with ISDN (integrated services digital network) or by analog means. The local area network IVDLAN can be connected to a public ISDN network which can be of a type known per se and arranged for basic or primary access. Connection is carried out by a communication server CS, terminal adaptor TA and network terminal NT. Two reference points S and R are also specified in FIG. 1.

Figure 2:
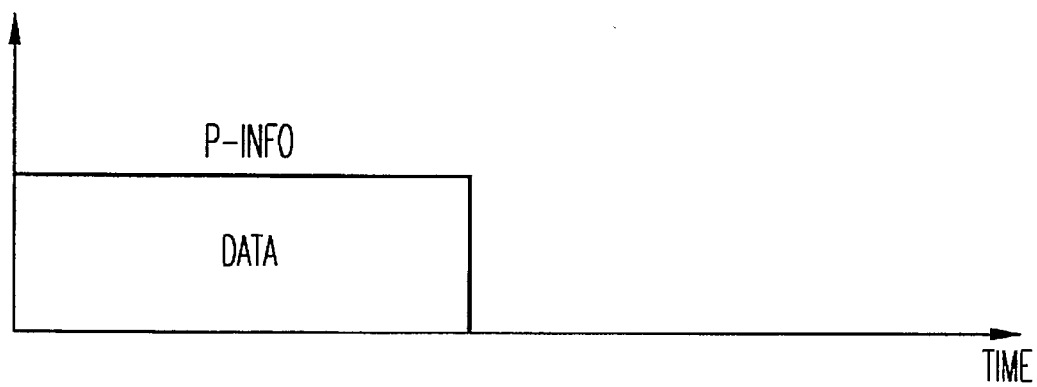
FIGS. 2, 2a and 2b show the distribution of bandwidth between speech and data with a hybrid access format.
Figure 2A:
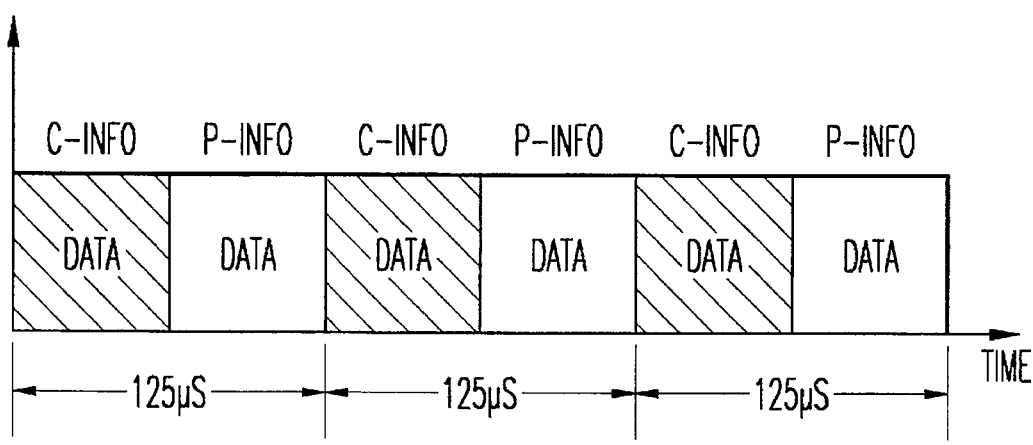
Figure 2B:
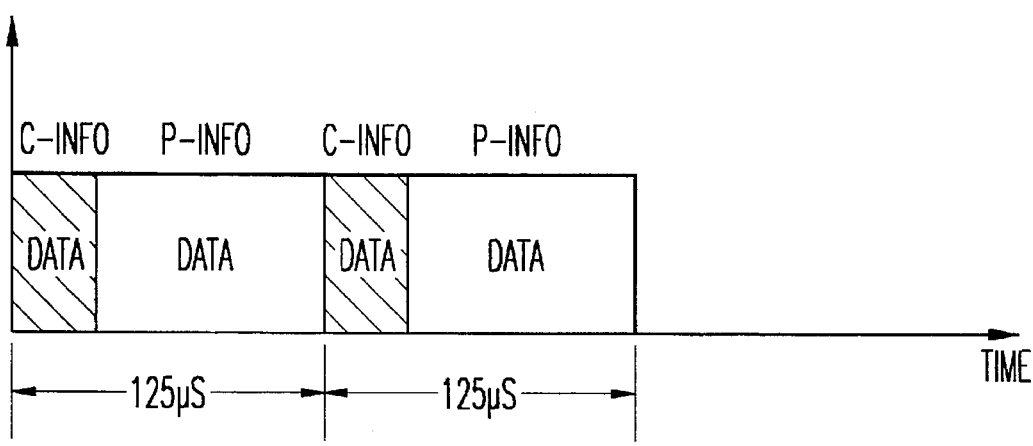
Figure 4:
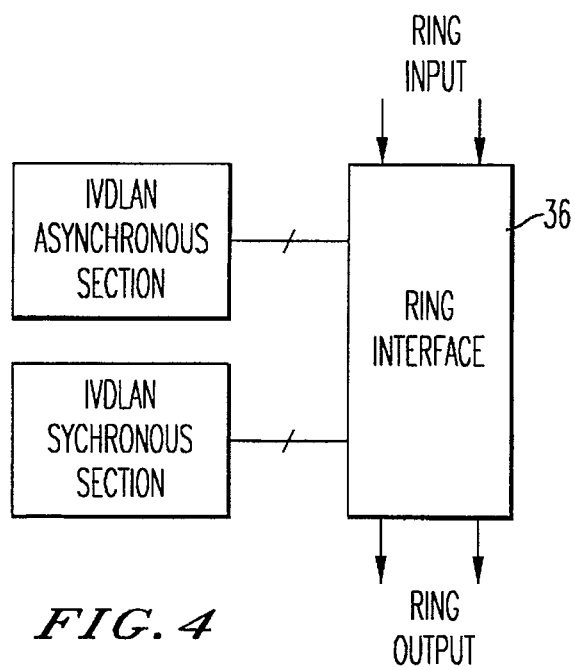
FIG. 4 shows in block diagram form hardware for an IVDLAN adaptor.

FIGS. 2, 2a and 2b show the different transmission cases where first and second information items about speech, video and so forth and, respectively, data on the medium can share accessible space/bandwidths. FIG. 2 shows the transmission of only data (P-INFO). In FIG. 2a, the bandwidth has been divided up equally between speech and data, and in FIG. 2b the speech information has taken up a quarter of the bandwidth while the rest is allocated for data and so forth. Thus, FIGS. 2a and 2b show the basic principle of a hybrid format.

Figure 3:
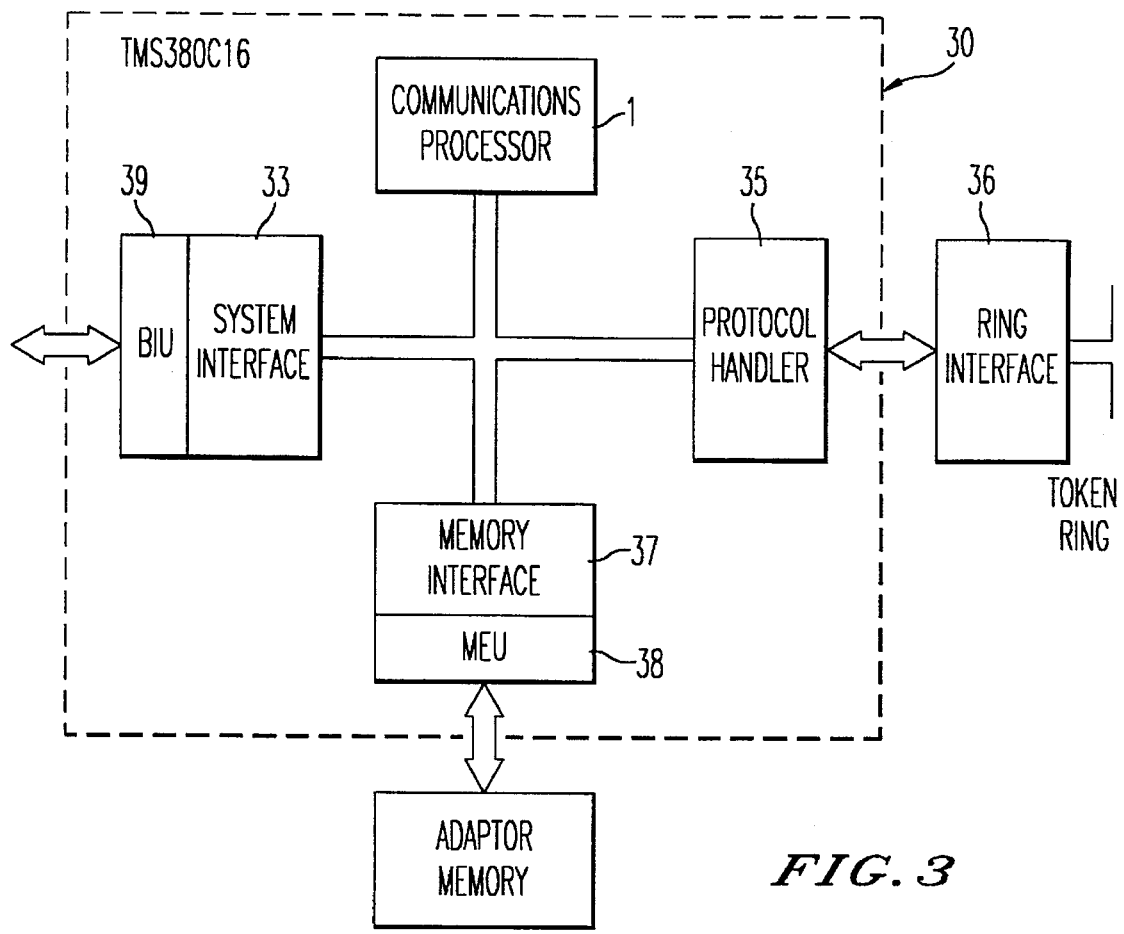
FIG. 3 shows in block diagram form a token-ring adaptor which is based on Texas Instruments TMS380 circuits.

FIG. 3 shows the structure of a conventional token-ring adaptor (30) based on Texas Instruments TMS 380 circuits such as TMS380C16 and TMS38053. Due to the fact that a special communication processor (31) is included, the data communication in the network does not load the normal processes of the personal computer. A bus interface unit BIU (39) is shown, as is a memory expansion unit MEU (38). The bus connections are specified with an adaptor bus. Moreover, a communication processor (31), protocol handler (35), memory interface (37) and system interface 33 are included. There is a ring interface 36 at the token-ring connection and an adaptor memory (39) coupled by the memory expander unit (38).

FIGS. 4–8 show the block diagrams for an IVDLAN adaptor according to the invention. Existing communication circuits for the token-ring system are included in the asynchronous section. The system operates in a time-division multiplexed relation. In accordance with FIG. 4, the hardware is divided up into three parts, namely ring interface 36, asynchronous section 42 and synchronous section 43. The ring interface connects the adaptor to the ring and is common to the asynchronous and synchronous sections.

Figure 5:
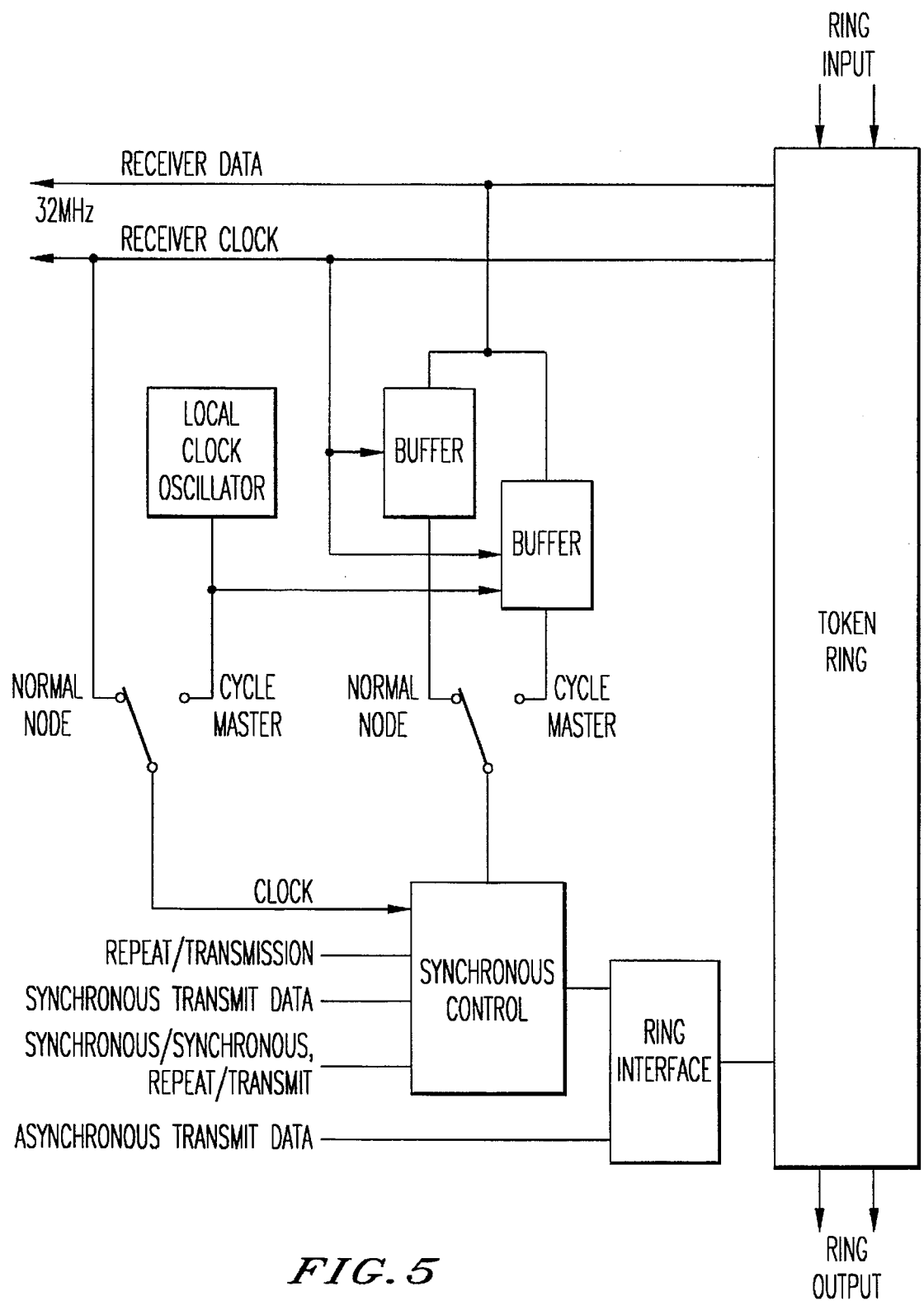
FIG. 5 shows in block diagram form an example of a ring interface where a master unit supplies a clock signal to the ring and sends a start delimiter in the form of a unique octet.

FIG. 5 shows how received asynchronous data are buffered and repeated partly normally, partly how they serve as cycle master unit. Since the block diagram according to FIG. 5 is of a type known per se, it will not be described in greater detail here, but reference is made to the text in the figures.

Figure 6:
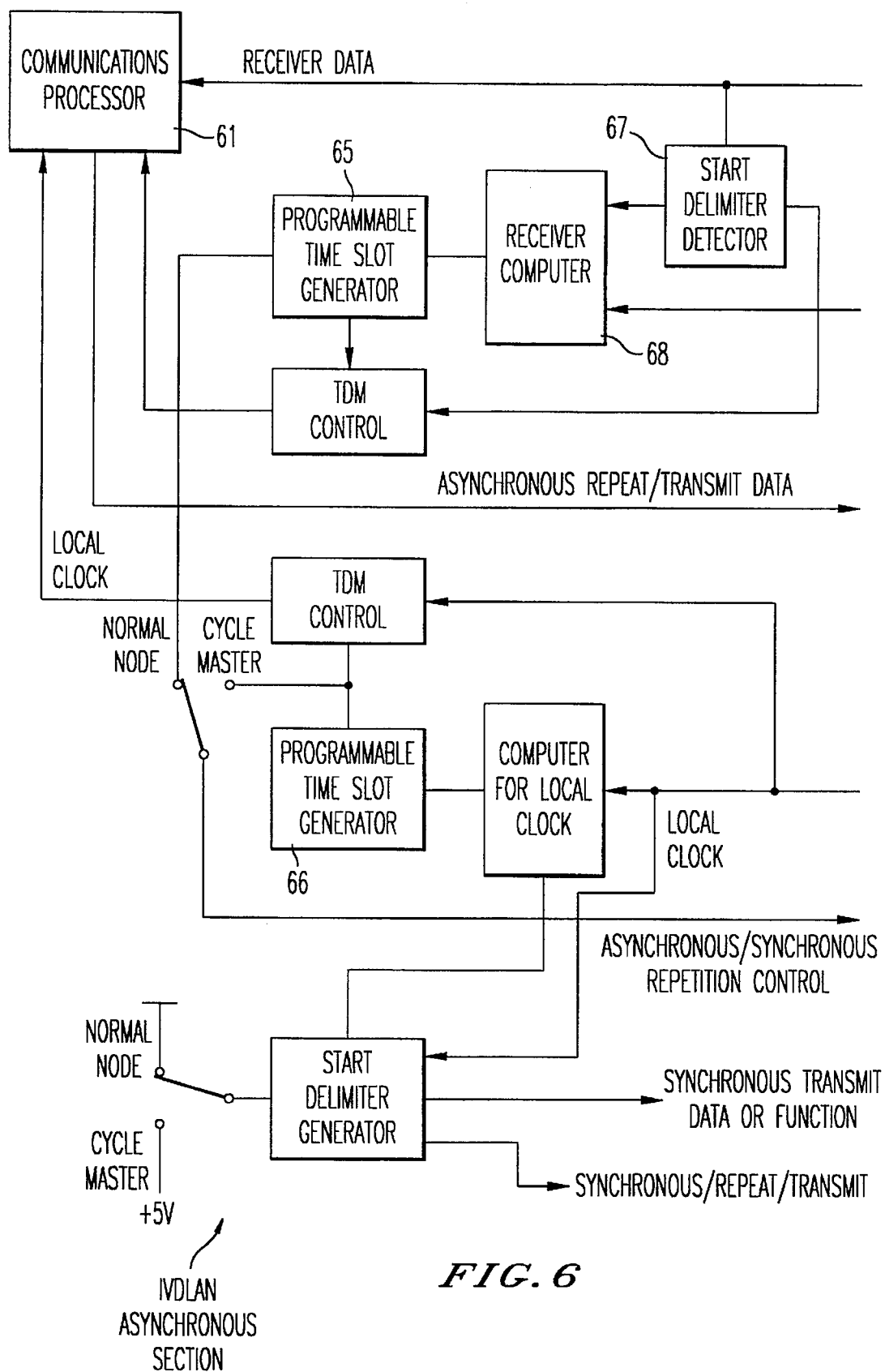
FIG. 6 shows in block diagram form the asynchronous section of the IVDLAN adaptor.

FIG. 6 shows the asynchronous section with communication processors for token-ring. A communications processor (61) is coupled to the received clock signal and to the local clock. Programmable time slot generators (65, 66) determine when the asynchronous section will be activated for receiving and transmitting. The start delimiter detector (67) senses the bit pattern which indicates that a new synchronous frame is starting and resets the receiver computer (68) to zero. The token-ring structure uses centralized clocking from a cycle master in a cycle master mode. The node which has the cycle master mode role also generates the start delimiter for the synchronous frame in the normal mode from start delimiter generator (64).

Figure 7:
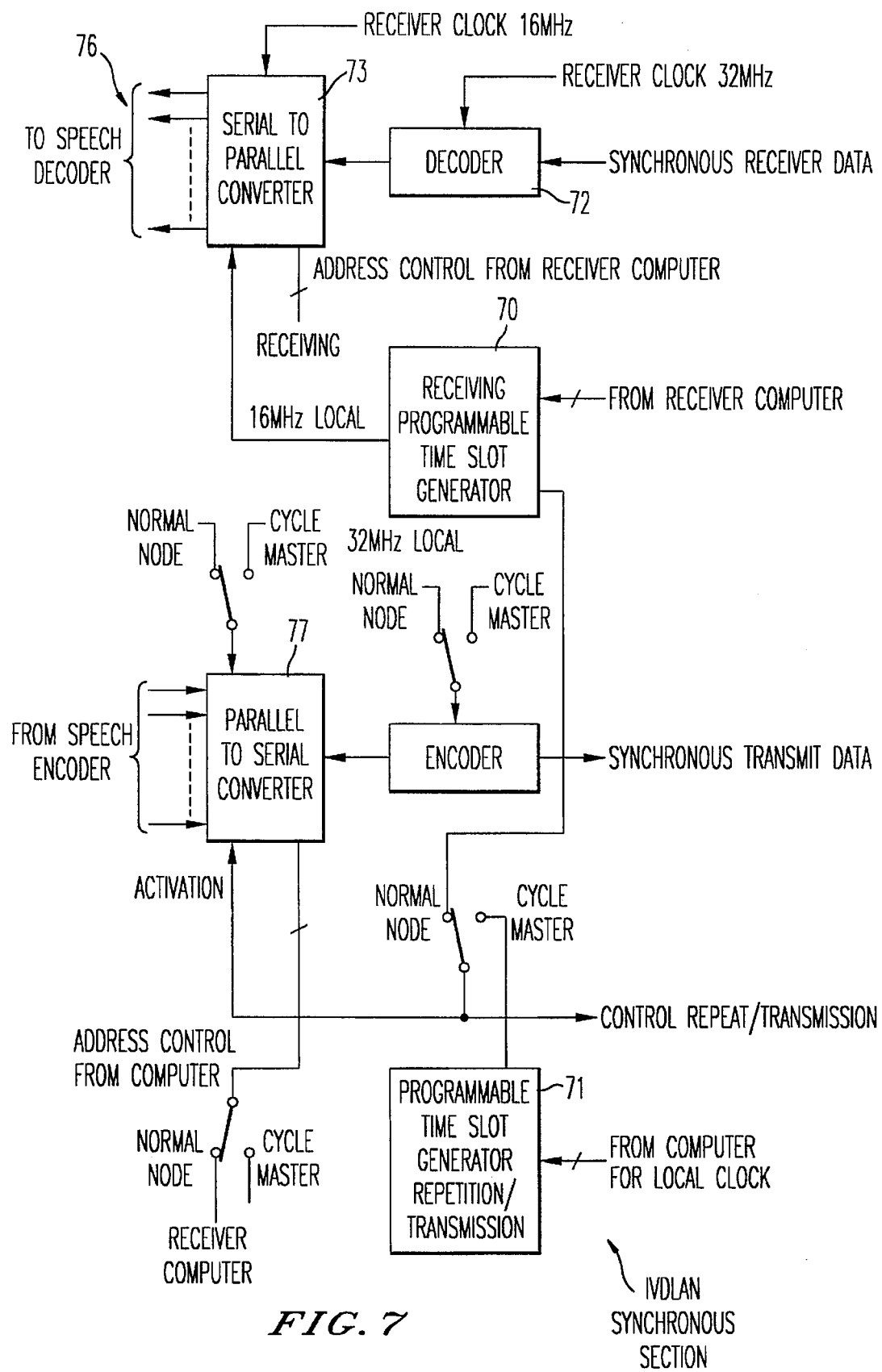
FIG. 7 shows in block diagram form the synchronous section of the IVDLAN adaptor for speech with 64 kbit/s.

FIG. 7 shows the synchronous section with 64Kbit/s speech transmission. Programmable time slot generators (70, 71) determine when the synchronous receiving and transmitting will occur. The received serial bit stream must first be decoded by 72 (it is coded in differential Manchester code). This is followed by serial/parallel conversion into 8-bit words in 73. The data are then clocked to an output port when the time slot generator output is active. The data at the output port (76) are forwarded to a speech decoder. On transmission, the activities occur in the reverse order. At the cycle master unit node, the local clock is used instead of the receiver clock and the time slot generator is coupled to a computer connected to the local clock. The parallel/serial converter (77) can also be controlled by different computers on transmission. When the synchronous section is active, repetition occurs when no transmission is in progress.

The arrangement comprises a software interface. Towards the upper section of the data link layer LLC (Logical Link Control), calls (Service Primitives), data request and data indiction are used. These are the only service primitives which are used in connectionless transmission. The data request call has the following appearance.

| DL-UNITDATA request( | |
|---|---|
| | source address |
| | destination address |
| | data |
| | priority |
| | ) |

Source address and destination address specify service access points for transmitter and receiver. Data specifies the data element which will be transmitted. Priority specifies the desired priority for the transmission. Analogously, the following applies to data indication:

| DL-UNITDATA indication( | |
|---|---|
| | source address |
| | destination address |
| | data |
| | priority |
| | ) |

Figure 8A:
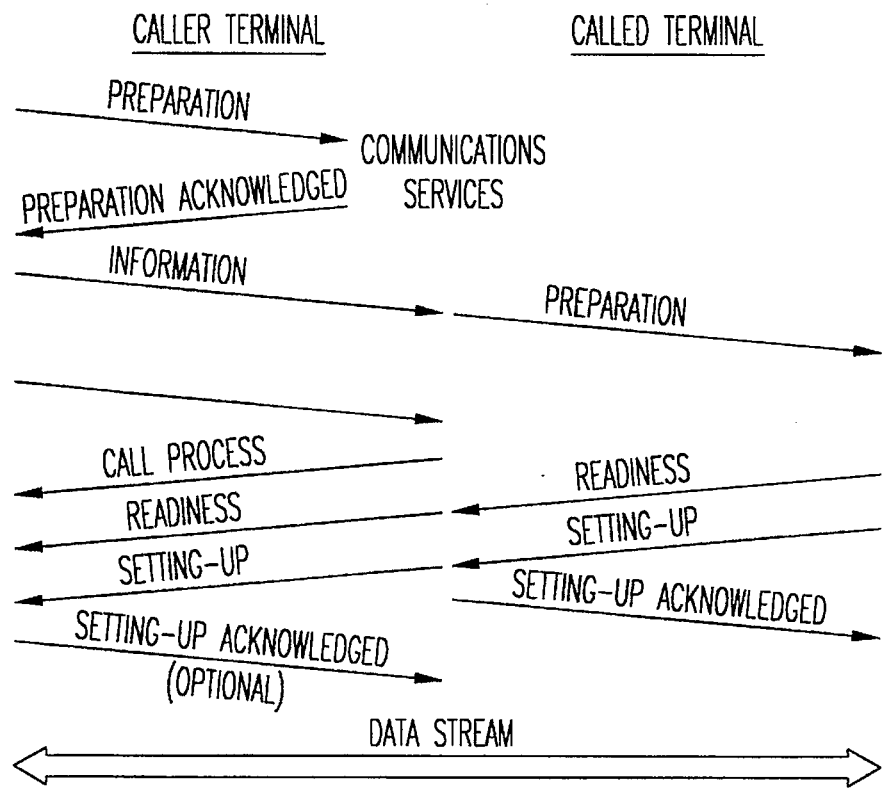
FIG. 8 shows in basic diagram form a single circuit-switched telephone call in which a communication unit node is assumed to administer setting-up and clearing.
Figure 8B:
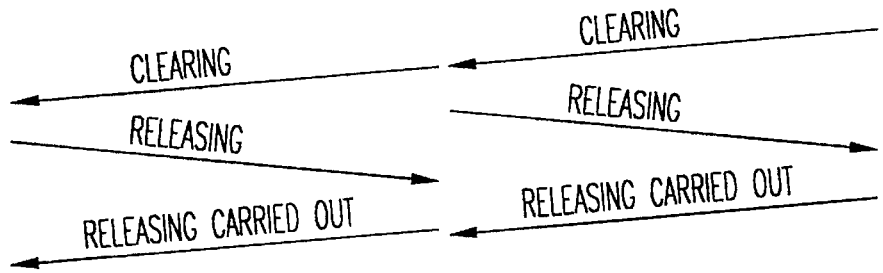
Figure 8C:
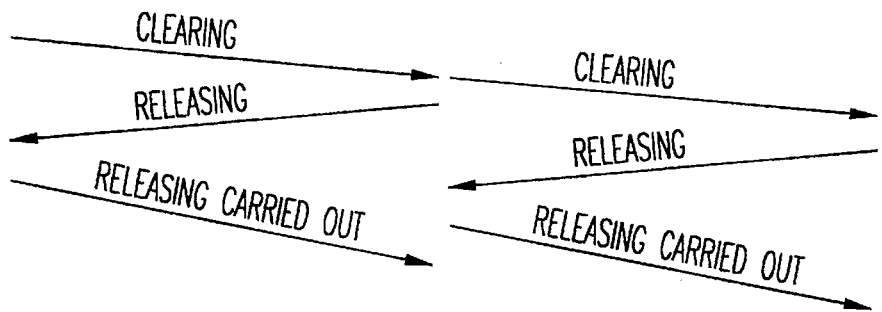

Software which is needed for setting-up and clearing synchronous connections is utilized. The common asynchronous channel is used for this purpose. FIG. 8 shows the signals which are needed in setting-up and clearing a telephone conversation. Coded messages are transmitted to and from the data link layer through call data request and data indication. Since the communication in one embodiment will be ISDN oriented, all handling with setting-up and clearing occurs in accordance with CCITT standard Q.931. The signalling procedures correspond to the network layer in the OSI model. The standard is comprehensive and detailed. These procedures can be applied for both internal and external connections in this application. In the case of internal connections, the common P channel is used for signalling and in the case of an external connection, the D channel is used. For the rest, reference is made to the Q.931 standard. The invention is also used as application program interface. Applications of an interface towards underlying network software called application program interface. If the application needs to utilize network services, it uses an application programming interface with the network software. The application program interface does not specify the layers the software comprises. Network services for setting-up and clearing synchronous connections are handled directly by the procedures in the network layer. Software for asynchronous data communication, for example for a file server, can use conventional existing network software. In connection with the setting-up and clearing of synchronous connections, time slots must be generated and, respectively, removed for the nodes inserted. The slot generation is programmable and can be changed dynamically on demand. Concerning a change of time slot for the common asynchronous channel, this must occur when intercommunication is taking place. With a transmission speed of 16 Mbit/s, the local area network will cope with the following in one embodiment:

Normal data communication including signalling of 4.48 Mbit/s one connection at 1.92 Mbit/s (only for occasional application, can be replaced by five connections at 384 Mbit/s)

five connections at 384 Mbit/s thirty connections at 64 kbit/s.

Three last-mentioned demands are met with 3.84 Mbit/s.

In the new protocol for speech and data, the normal LAN data communication is carried out in such a manner that data messages cannot be sent in one sequence but must be divided up into parts of certain length provided they are not very short. The space between the parts or segments is utilized for speech and image information. This is necessary since speech and image information must return with regular time intervals (so called isochronous information).

DTM (Dynamic synchronous Transfer Mode) is an access method for synchronous multiplexing and dynamic allocation of bandwidth. It is known to utilize this method for high communication speeds on optical fiber. Reference is also made to the technique in connection with a standard for integrating speech and data, namely IEEE 802.9, which, however, does not use the principle of common medium and distributed exchange functions. DTM is already well known and will not be described in greater detail here, but it will only be stated that, for compatibility with the asynchronous data communication which is normally used in a LAN, a number of time slots can be used for an asynchronous channel which is common to all computers which are connected to the local area network. For asynchronous messages which are longer than the number of allocated time slots for the asynchronous channel, a dividing-up must be carried out so that the message is transmitted in a number of synchronous frames. In this manner, the asynchronous communication is overlaid upon the synchronous communication. The access protocol according to the invention can be considered as a hybrid of circuit switching and packet switching. In accordance with the invention, the beginning and end of the asynchronous frames will be specified in a suitable manner. An asynchronous message frame is followed either by a new one from the same computer or from the token. After transmission of the message frame or token, padding is transmitted in a manner known per se.

In accordance with the invention, the asynchronous channel is used, and for this to occur as effectively as possible it must be possible to locate the start and end delimiter anywhere in the sequence of time slots. The message which is delimited by start delimiter and end delimiter constitutes an asynchronous frame. The asynchronous frame can extend over a number of synchronous frames. The length of an asynchronous message is only limited by the demand for a fair access to the common channel.

Figure 10:
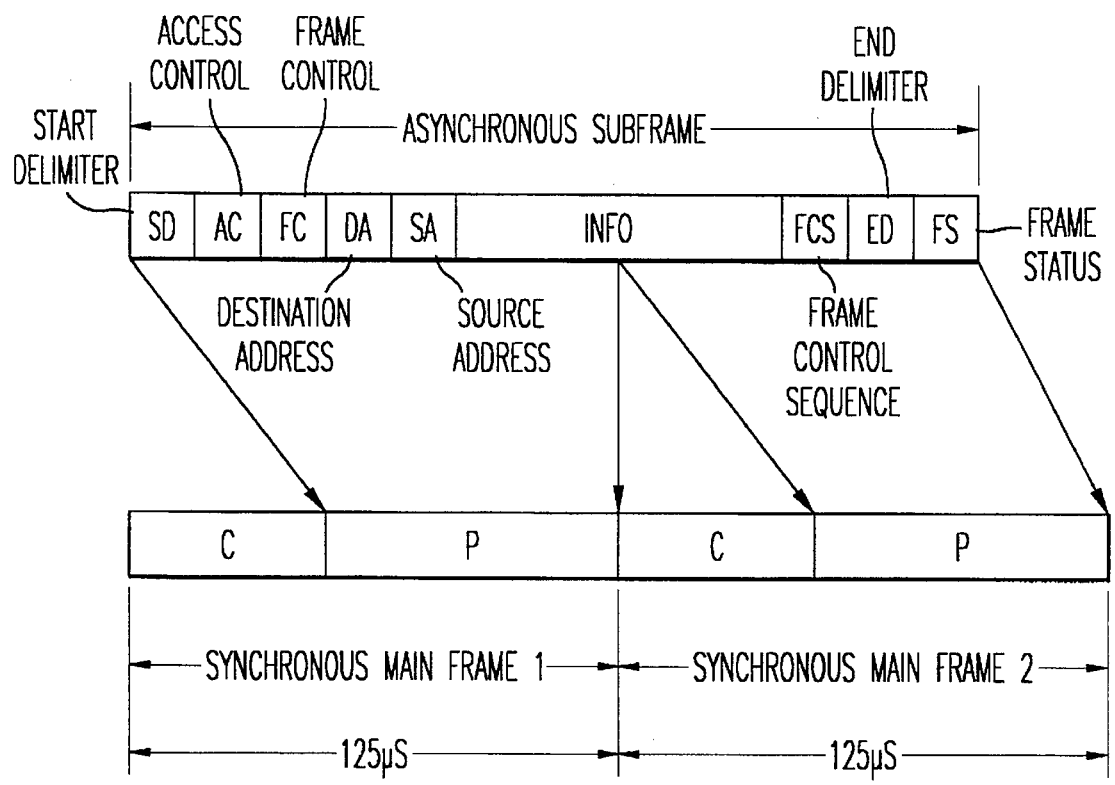
FIG. 10 shows an asynchronous frame overlayed on two synchronous frames.
Figure 9:
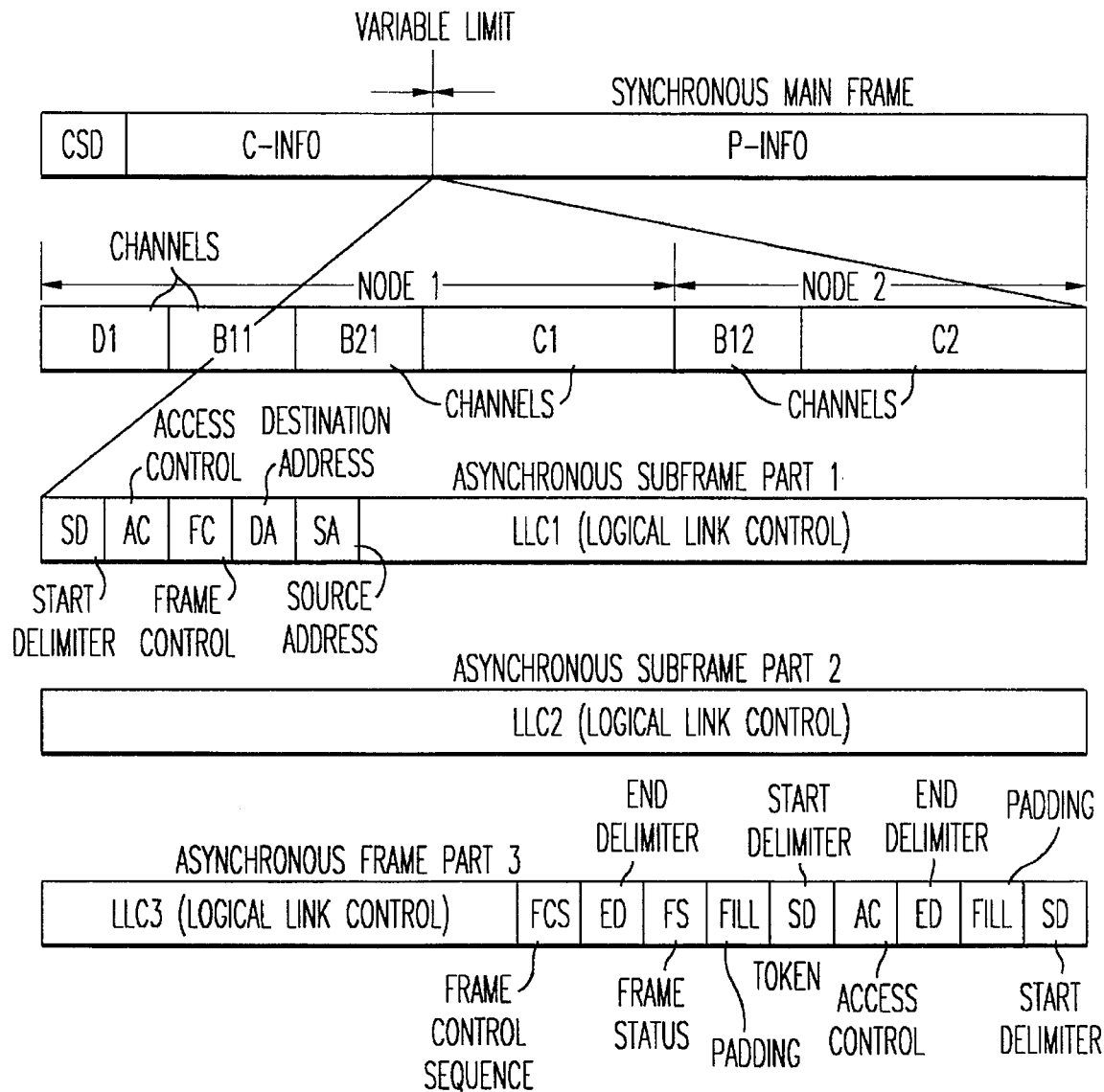
FIG. 9 shows an example of a format for a hybrid frame.

In accordance with the invention, a number of computers must be able to insert information into one and the same synchronous frame. Synchronization is thus carried out in the different computers with their different clock oscillators. It will be possible to use high speeds, which can be facilitated on transition to optical fiber. The token-ring principle can be applied in this connection. The ring consists of a number of point-to-point connections and therefore only one is transmitting at a time. The information is normally repeated in each node, which results in a delay of 1 bit. To go into and change or add to the received information is a normal measure. Each computer is therefore given the possibility to change its speech or video information even when a second computer is transmitting data in the same synchronous frame. The strength of the token-ring protocol lies in the fair access which can be obtained with the token which is sent around as soon as someone has finished transmitting data. The transmitted message is coded with differential Manchester coding. The code contains both data and synchronization information (clock). The code contains digital ones and zeros and there are also two Not-Data symbols. Since signals (time slots) containing Not-Data symbols cannot occur in data information, they can thus be used as special signals for delimiting frames. The token-ring protocol normally uses two such signals, one for start delimiting and one for end delimiting. In the composite hybrid protocol there is a need for at least one further such special signal for designating the start delimiter for a synchronous frame. After a message frame is transmitted, the padding to the token is transmitted. This padding can be carried out in a manner known per se. In accordance with the above, the synchronous section of the hybrid protocol used for speech and video is also coded with differential Manchester coding. In synchronous information, speech and video is provided. This information is transmitted in channels which are set up. Bearer services are provided with speeds which can be made up of multiples of 64 kbit/s up to 20048 Mbit/s. One of the stations, suitably an active monitor, can be allocated the role of cycle master. This means that the station creates the start delimiter for a synchronous frame which is sent at the beginning of each cycle at 125 Ms intervals. The synchronization signal is one octet long. No terminating signal is needed since the frame comprises a specific number of octets, namely 250 for the transmission speed of 16 Mbit/s. Isochronous information is coded according to some standard. It is transmitted in the time slot which has been obtained on setting-up and is received by the receiver in the same time slot. A time slot can consist of one or more octets. Speech is coded with eight bits of 125 Ms each for the ISDN speech service. Speech coding can be carried out in accordance with CCITT recommendation G.711 for pulse-code-modulated speech. On transmission, parallel/serial conversion occurs and on reception serial/parallel conversion occurs. Before the information is transmitted on the ring, it is coded with differential Manchester coding and, on reception, decoding must first occur. Two types of frames can occur, on the one hand the basic synchronous frames and on the other hand the split asynchronous frames which are superimposed on the synchronous ones. FIGS. 9 and 10 show for a synchronous frame how in each case one asynchronous frame can be divided up over a number of synchronous frames.

FIG. 9 in principle shows one frame format,

FIG. 10 in principle shows how an asynchronous frame can be divided up and placed into the fields of two synchronous frames following one another.

FIG. 9 shows that the C-INFO section contains circuit-switched channels D channel, B channel and C channel. The P-INFO section contains one P channel. In the D channel, the bearer service itself is provided as one channel for 64 kbit/s. The B channel can occur in two B1 and B2 channels corresponding to basic access in ISDN and can be used for speech and/or data per node. In this case, only the bearer service itself is provided as one channel for 64 kbit/s. The D channel can be used as bearer service for video or fast data transmission. The P channel is used for common asynchronous data communications (packet switching). In this connection, reference is also made to the OSI reference model. FIG. 9 also shows how the reference model for IVDLAN is related to the reference model for OSI. LLC means logical link control, AC means access control and LAPB, LAPD are protocols for data communication. In accordance with the token-ring principle, all units connected to the ring can listen in and receive when a unit is transmitting. In the ring network, it is only one station, the next in the ring, which can pick up the transmission, the frame travels around in the ring due to the fact that the stations, in order, copy bit by bit of the frame from the input and at the output. When the frame comes back after a turn around the ring, it is removed by the originator. One frame with a special appearance, the token, always travels around in the ring. A frame with data which is transmitted through the ring between two stations consists of the token which is modified and appended with an address field, information field and other parts which are used for data or checking. If no activity is occurring in the network, the token travels around by itself, this time with an appearance which indicates that it is free. When a station receives such a token, it has the right to transmit within a certain predetermined time. All stations check the address part in each received data frame in order to see if it should be copied into the station. This also provides the possibility of inserting certain information to the originator, among others for confirming that it has received the frame before it forwards the packet to the next station. When the originator gets the frame back, it can be removed and, if there is still time, the station can send another frame. The transmission speed is 8 Mbit/s or 16 Mbit/s. One of the stations or nodes is allocated the role of active monitor. It transmits with a crystal-controlled clock signal as reference. The other stations use a locked oscillator for synchronizing reception and transmission with the received signal. When the bit stream has passed around the ring and is received by the receiver of the active monitor which is locked to the received signal, the received bit stream is no longer in phase with the crystal-controlled clock. To compensate for differences, an elastic buffer is used which clocks the received data with the locked clock and transmits data with the crystal-controlled clock. The token-ring protocol uses a signalling format which is called differential Manchester coding of a type known per se. As regards the format, a frame format is referred to which is already known. This also applies to the functions for frame checking, destination address, source address and so forth. The structure of the asynchronous frames is also considered to be previously known. With regard to the token, there are two possibilities of transmitting this, among others, directly after the transmission of the information frame (early token release). This procedure entails increased effectiveness in the present case. The abort function is also already known.

In FIG. 9, CSD specifies the start delimiter for a synchronous frame. C-INFO specifies circuit-switched information, with speech, video, data and signalling. P-INFO shows common packet-switched information, data only. D1 is a D channel for signalling node 1, 64 kbit/s, 1 octet. B11 specifies a B1 channel for speech or data node 1, 64 kbit/s, 1 octet. B21 specifies a B2 channel for speech or data node 1, 64 kbit/s, 1 octet. C1 specifies a circuit-switched channel for video node 1, 128 kbit/s, 2 octets. B12 specifies a B1 channel for speech or data node 2, 64 kbit/s, 1 octet, C2 constitutes a circuit-switched channel for video node 2, 384 kbit/s, 6 octets. SD is a start delimiter for asynchronous frames. AC is an access control unit and FC a frame control unit or type of frame. DA specifies a destination address and SA a source address. LLC is a protocol for upper data link level and FCS is an error check of 4 octets. The end delimiter of 1 octet is indicated by ED and the frame status by FS, 1 octet. FILL is the padding consisting of, for example, only zeros, to the next SD.

FIG. 10 shows how an asynchronous frame can be divided up into two synchronous frames following one another and inserted into its P field. The C field part of the synchronous frames contains fields for synchronization of speech and image information. The number of synchronous frames which return for dividing up is determined by the length of the asynchronous frame and the length of the P field. The designations in the asynchronous frame specify fields with different significance and length. The asynchronous frame can begin and end anywhere in the P field.

The invention is not limited to the embodiment shown above by way of example but can be subjected to modifications within the scope of the following patent claims.

What is claimed as new and desired to be secured by Letters Patent of the United States is:

1. A data communications network comprising:
   a plurality of data communications units interconnected by a communications medium which carries data transmissions from a transmitting unit to a receiving unit;
   each of said transmitting and receiving unit comprising a data transmission control and emitting portion, a data receiving control and reception portion, and a mode control portion to configure each of the plurality of data communications units into a send mode in which said data transmissions occur and a receive mode in which data is received;
   each said data transmission control and emitting portion including a data transmission format control section which provides said data transmission during said send mode as main data frames, each main data frame being provided with a start main data frame delimiter encoded segment followed by a data area of fixed duration that is encodable as N data slots, each said data slot having a data capacity of M bits of data, N and M both being integers greater than 1;

each said data transmission format control section further providing at least some of the main data frames in said data transmission during the send mode with at least C of the N data slots having encoded therein periodic data, C being an integer greater than 1; and said data transmission format control section further having a dynamic controller that detects whether or not all of the available N data slots of the data area of fixed duration have been used to encode said periodic data and then provides at least a portion of any unused ones of the N available data slots with an encoded delimiter area for marking an asynchronously encoded subframe portion within said main frames while also providing another portion of said unused ones of the N available data slots as an aperiodic data encoded asynchronous subframe portion of P data slots, wherein P is an integer greater than 1.

2. The data communications network of claim 1, wherein the encoded delimiter area of the asynchronous subframe portion indicates the start thereof.

3. The data communications network of claim 1, wherein the asynchronous subframe portion is fully contained within one main frame and is followed by a stop subframe delimiter area.

4. The data communications network of claim 1, wherein the encoded delimiter area of the asynchronous subframe portion indicates the start of said asynchronous subframe portion and when the following asynchronous subframe portion extends into another main frame, said another main frame also contains a subframe stop delimiter encoded area which indicates the end of the asynchronous subframe portion.

5. The data communications network of claim 4, wherein said another main frame also includes C slots of encoded periodic data, wherein the number of said encoded C slots in a particular frame is equal to the number of encoded P data slots in said particular frame.

6. The data communications network of claim 4, wherein said another main frame also includes C slots of encoded periodic data, wherein the number of said encoded C slots in a particular frame differs from the number of encoded P data slots in said particular frame.

7. The data communications network of claim 1, wherein at least some of the data communications units are part of a local area network and the mode control portions thereof cause transmitting or receiving to occur using an asynchronous protocol.

8. The data communications network of claim 7, wherein the asynchronous protocol is a token-ring protocol.

9. The data communications network of claim 7, wherein the asynchronous protocol is a fiber distributed data interface protocol.

10. A data communications network as claimed in claim 1, wherein said mode control portions cause some units to be operated as transmitting units and some units to be operated as receiving units and said data transmission format control section provides said receiving units with synchronization data encoded in at least some of said C data slots or encoded in at least some of said P data slots.

11. A data communications network as claimed in claim 1, wherein said mode control portions cause some of said units to be operated as transmitting units and some of said units to be operated as receiving units and said data transmission format control section provides said receiving units with synchronization data encoded in at least some of said P data slots.

12. The data communications network of claim 10, wherein said synchronization data is transmitted in a common data communications channel contained in the encoded C data slots or the encoded P data slots being transmitted under control of said data transmission control and emitting portion of each transmitting unit.

13. The data communications network of claim 11, wherein said synchronization data is transmitted in a common data communications channel formed in the encoded C data encoded slots under control of said data transmission control and emitting portion of each transmitting communication unit.

14. The data communications network of claim 1, further comprising:

an interface controlling unit that provides network interchange of synchronous C encoded data slots transmitted via the medium with an external private automatic branch exchange connected to the medium.

15. The data communications network of claim 1, wherein at least some of the plurality of data communications units include personal computers as well as a separate input for periodic data.

16. The data communications network of claim 7, wherein at least some of the plurality of data communications units include personal computers as well as a separate input for periodic data.

17. The data communications network of claim 1, wherein the network forms a local area network and further comprises a control interface for communicating with an external integrated services digital network communications system.

18. The data communications network of claim 1, wherein said transmission control and emitting portion encodes at least some of the P slots with periodic data and at least some other of the P slots with aperiodic data.

19. The data communications network of claim 18, wherein said transmission control and emitting portion encodes at least one of the P data slots with all zeros.

20. The data communications network of claim 19, wherein said transmission control and emitting portion encodes some of the P data slots with address data.

21. A method of formatting data and transmission of formatted data on a communications medium interconnecting a plurality of transmitting and receiving units, comprising:

providing transmissions from any transmitting unit as a sequence of main frames each of which include a start delimiter followed by a data area of fixed duration that is encodable as N data slots, each said data slot having a data capacity of M bits of data, N and M being integers greater than 1;

encoding at least C of the N data slots in the main frames with periodic data to form an encoded synchronous frame segment, C being an integer greater than 1;

detecting which of the N data slots of the data area of fixed duration in each main frame are free slots that have not been encoded with said periodic data;

encoding at least one of the detected free slots as a start delimiter of an asynchronous subframe;

further encoding at least some others of the detected free slots with aperiodic data to form P data slots as part of the asynchronous subframe, wherein P is an integer greater than 1; and still further encoding at least one of the detected free slots as a stop delimiter of the asynchronous subframe.

22. A method as set forth in claim 21, wherein the steps of encoding the start delimiter of the asynchronous subframe, further encoding the P data slots and still further encoding the stop delimiter of the asynchronous subframe are all performed during a period coextensive with a main frame duration such that the asynchronous subframe is fully contained within said main frame duration.

23. A method as set forth in claim 22, wherein the steps of encoding the start delimiter of the asynchronous subframe, further encoding the P data slots and still further encoding the stop delimiter of the asynchronous subframe are all performed during a period overlapping the duration of at least two main frames such that the resulting asynchronous subframe is contained within the duration of said at least two main frames.

24. The method of claim 21, wherein the transmitting and receiving units and the communications medium comprise a local area network and further including the step of transmitting formatted data between the units of the local areas network and a network external to said local area network via said communications medium.

25. A method of claim 21, wherein the step of encoding at least C of the N data slots with periodic data includes a step of encoding synchronizing data for the control of said receiving units.

26. A method as claimed in claim 21, wherein the step of encoding at least some others of the detected free slots with aperiodic data to form P data slots includes encoding at least some others of the free slots with synchronizing data for synchronizing said receiving units.

\* \* \* \* \*